United States Patent [19]

Tom

[11] 4,297,686
[45] Oct. 27, 1981

[54] WATER DETECTION DEVICE

[76] Inventor: M. Dale Tom, R.D. #1, Norwich, Ohio 43767

[21] Appl. No.: 80,658

[22] Filed: Oct. 1, 1979

[51] Int. Cl.³ ............... G08B 21/00; F16K 23/00
[52] U.S. Cl. .................. 340/604; 137/78.1; 174/117 A; 200/61.05; 340/605; 340/620; 340/636
[58] Field of Search ............... 137/312, 558, 78.1; 174/117 A; 340/602, 604, 605, 693, 636, 620; 200/61.04, 61.05, 61.06

[56] References Cited
U.S. PATENT DOCUMENTS

| | | | |
|---|---|---|---|
| 2,735,907 | 2/1956 | Inman | 200/61.05 |
| 2,749,382 | 6/1956 | Lockard | 174/117 A |
| 3,200,388 | 8/1965 | Uhlig | 340/604 |
| 3,221,317 | 11/1965 | Ferrigno, Jr. | 340/602 X |
| 3,562,731 | 2/1971 | Hsu | 340/604 |
| 3,594,751 | 7/1971 | Ogden et al. | 340/636 X |
| 3,770,002 | 11/1973 | Brown | 137/312 |
| 3,778,570 | 12/1973 | Shuman | 340/604 X |
| 3,824,460 | 7/1974 | Gustafson | 340/604 X |
| 3,882,476 | 5/1975 | Löfgren | 340/602 X |
| 4,020,478 | 4/1977 | Hatfield | 340/604 |
| 4,069,817 | 1/1978 | Fendle et al. | 340/604 X |
| 4,106,001 | 8/1978 | Mahoney | 340/604 |

FOREIGN PATENT DOCUMENTS 1175923  4/1959  France ................ 174/117 A

Primary Examiner—John W. Caldwell, Sr.
Assistant Examiner—Daniel Myer
Attorney, Agent, or Firm—Cushman, Darby & Cushman

[57] ABSTRACT

A resistive liquid detection and shut-off system is used to protect a floor area from water damage. An elongated sensor comprising a flexible plastic tape with an adhesive backing and a pair of conductive metal strips detects liquid drips, flows and trickles, but not liquid beads. A detection circuit measures resistivity changes in the sensor, and an output circuit activates a solenoid-operated water shut-off valve in response to predetermined resistivity changes in the sensor. A connector comprising a body of electrically insulating material with electrical terminals thereon connects portions of the elongated sensor together so that they can have any length and relative position. A battery may provide the power for the entire system, with a battery voltage monitoring circuit also provided.

4 Claims, 8 Drawing Figures

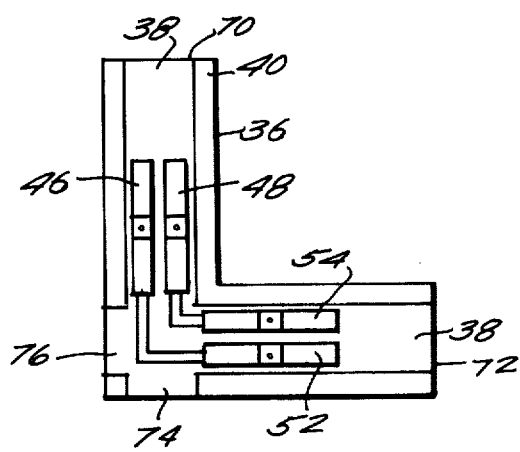
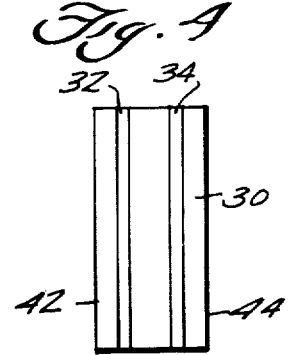
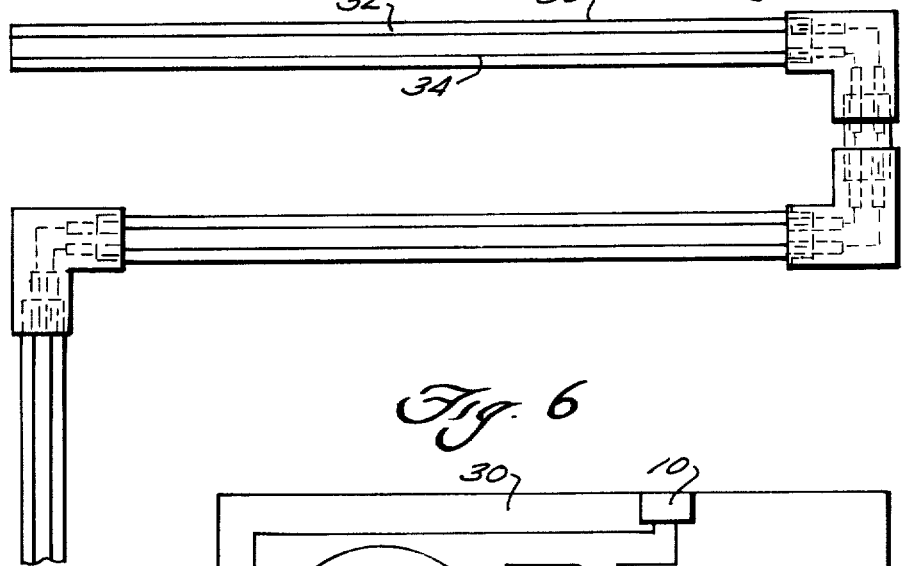
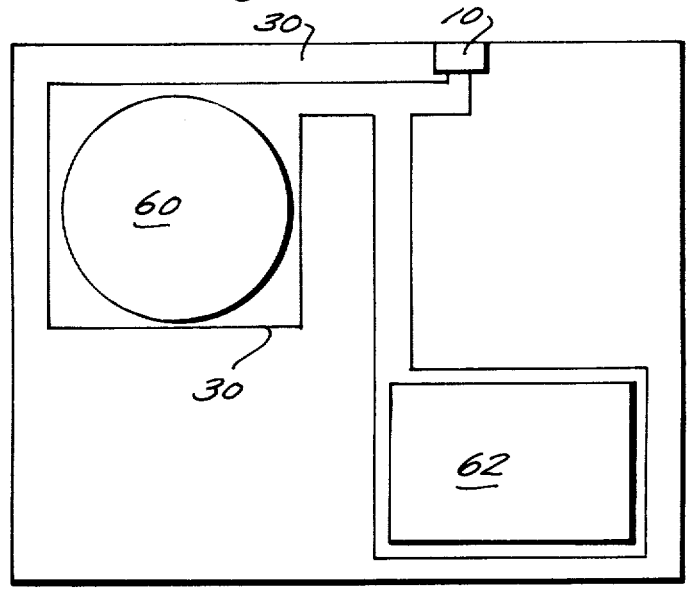

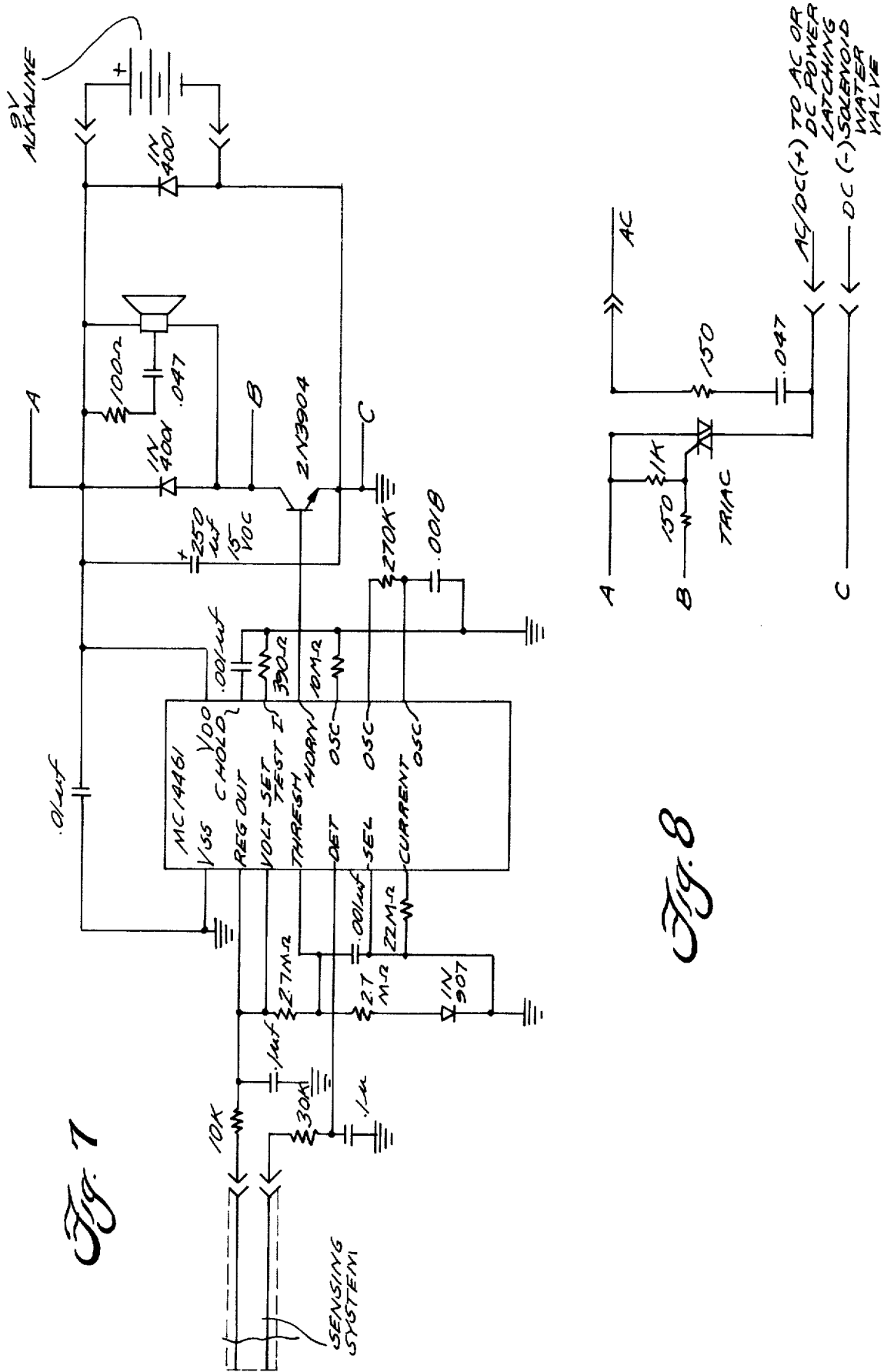

WATER DETECTION DEVICE

BACKGROUND OF THE INVENTION

1. Field of the Invention

The present invention relates to a water detection and alert system for detecting the presence of water and leaks from appliances in homes or apartments by employing an extended sensing device that may be conveniently disposed in the form of strips in areas of a home or apartment where water would be expected to accumulate in the event of a leak from an appliance or from cracks or faults in walls which could be expected to seep water. More particularly, the invention pertains to a water detection device employing a resistive sensing system for detecting water in low, shallow pools which as a result of the slowness of the water leak in conjunction to the absorbency of the substrate has the potential of creating serious property damage. The invention employs a sensor system capable of customized disposition and electronic detection and alarm circuit that is compatible with existing fire alarm circuits and a cabinet housing which is mountable at a source removed from the extended sensor.

2. Description of the Prior Art

The prior art includes a variety of patents pertaining to water leak detection devices which are designed to detect water and automatically shut-off an appliance or provide an alarm in the event water is detected in the vicinity of a water using appliance. A significant amount of this prior art utilizes sensing devices of various types and configurations which are not extended or in other words, are confined to a particular area or locality where water will be assumed to collect in the event of a leak. Representative of this prior art are patents such as Hatfield, U.S. Pat. No. 4,020,478, Jui-Cheng Hsu, U.S. Pat. No. 3,562,731, Uhlig, U.S. Pat. No. 3,200,388, and Brown, U.S. Pat. No. 3,770,002.

In such prior art water detection devices, the efficiency of the detection device is severly limited by the fact that if the water does not reach the water sensor, the alarm will not be sounded even though a slow leak may cause substantial damage since the rate at which the water enters a room may be compensated by the absorption of the water into rugs, cracks between the boards in the wooded floor, and as a result, cause substantial damage to the foundation of a house or to the ceiling and floors below in the case of an apartment.

The prior art primarily utilizes capacitive sensing systems to detect water from leaking appliances or other sources. Illustrative of prior art patents utilizing capacitive circuits for water detection systems are Ferrigno, U.S. Pat. No. 3,221,317, Brown, U.S. Pat No. 3,770,002, and Gustafson, U.S. Pat. No. 3,824,460. The utilization of capacitive water detection systems requires an oscillator in order to detect capacitive changes, these oscillators generate by their nature, radiated emissions which may effect surrounding equipment if not shielded. Furthermore, the capacitive system of sensing water or leaks is cumbersome in comparison with the present invention and therefore electrical radiation is not generated nor is a shield required for the present invention and the present system utilizing resistive sensor which allows the present system to interface with existing fire alarm detection integrated circuits.

Gustafson, U.S. Pat. No. 3,824,460 employs a capacitive sensing system which utilizes a sensor that may be disposed in an area or room in a configuration which like the present invention does not require the disposition of the sensor at one particular location. The prior art patent Gustafson however, represents a capacitive sensing system which requires water to cover specific areas of the sensing wire in order to detect water and furthermore does not detect small amounts of water that may travel along the sides of the water sensing device, see for example FIG. 2. Furthermore, the capacitive sensing system of the prior art does not interface with existing fire alarm detection integrated circuits and requires an adjustment of the detection device upon the addition of additional lengths of the sensor strip. The sensor strip, furthermore, cannot be used to bend around corners without losing its capacity to detect water.

The present invention may be distinguished from such prior art water detection devices in a number of significant respects. Perhaps the most distinguishing feature of the present invention over the prior art resides in the utilization of a resistive sensing system along with a sensor strip that can be utilized to bend around corners and encircle appliances while being quickly and easily installed to provide a sensitive leak detection system having an improved capacity for the detection of water. Unlike the prior art patents utilizing a single sensor and prior art patents using an extended sensor, the extended sensor of the present invention can be designed to bend around corners without losing its capability of detecting water.

The present sensor can be formed on an ultra-thin plastic tape with an adhesive backing which can be installed on the floor, wall areas and other places which are susceptible to the leakage of water. The thickness of the sensor which may be a thin mylar strip, and may be only a few thousandths of an inch thick, allows small streams of water to be detected by the sensor device and as a result, provides a means for correcting the leakage of water by the sounding of an alarm or in an alternative embodiment, the shutting off of the water supply system or the appliance.

Further, unlike the prior art, the present invention provides an efficient and economically manufactured water detection system that does not require adjustment and recalibration of the capacitive sensing circuitry upon the addition of additional strips or lengths of sensor tape. In addition, the prior art capacitive sensing systems may lose much of their effectiveness in the calibration of the system or the failure to recalibrate upon the addition of subsequent lengths of sensor. Since the present invention is based upon a resistive system, calibration is not required in order to provide an accurate and efficient water alert and detection system. Furthermore, the integration of the present resistor sensor to existing fire alarm detection equipment and burglar alarm detection equipment provides a means for the integration of one or more existing systems to a single alarm system. These advantages of the present invention are inherent in the present combination of elements utilized to provide a superior yet economically produced water leak detection system.

SUMMARY OF THE INVENTION

The disadvantages and limitations of prior art water leak detection systems and the difficulty of adding additional sensor inputs or additional sensor area to the water leak detection system is obviated by the present invention which provides a resistive sensing system that is compatible with existing fire and burglar alarm systems and need not be shielded since an oscillator is not employed in the electronic detection and alert circuitry of the present invention. The invention achieves its advantages by utilizing a resistive sensor in the form of a thin mylar tape having an adhesive backing to allow the tape to be installed by contact on basement floors, surfaces, and walls to detect water leakage or drainage.

The resistive sensor allows the user to dispose the sensor in whatever configuration required to provide maximum protection for the detection of water or other liquids from unwanted sources. This allows complete coverage and specific coverage of various areas that are particularly susceptible to water damage. In addition, the electronic detection and alert circuit utilizes a resistance measuring and monitoring device for compatibility with the resistive sensors to allow additional sensor tape to be added to an existing system without having to recalibrate the entire system. The resistance circuitry is completely campatible with existing resistance circuitry commonly utilized in electronic detection and alert circuits as is used in burglar alarms and fire alarms so that the present invention may be connected to a centralized alarm to provide a single warning device for water leakage and for example, fire.

The invention utilizes low-cost components to provide a superior water alert system to monitor and detect water leakage and may for example include additional circuitry to shut-off either an appliance in the vicinity of the water leak detection system or shut-off the main water valve to the house or apartment after the detection of water by the alert system of the present invention. Alternatively or in conjunction with the water control system for turning off the water in the case of a leak, the present invention may utilize a horn or sounding device to warn occupants of possible water damage due to leaks detected by the system of the present invention. The sensing device of the present invention is particularly effective in detecting water leakage and coupled with the sound device and a latching solenoid water shut-off valve, the water alert system of the present invention can be utilized to provide automatic protection of residences even where the occupants are not present.

The present invention achieves its advantages by a combination of three basic components, which consist of an improved water sensing system which utilizes a resistance type sensor that may be expanded or placed in a configuration that is necessary or desirable for the detection of unwanted water leaks. The second part of the water sensing system is the electronic detection and alert circuits which may be integrated with the fire alarm integrated circuits or burglar alarm integrated circuits. The third portion of the invention is the cabinet housing which contains the electronic circuitry and which may be mounted at a point remote from the extended sensor and the area covered by the mylar sensing ribbon of the sensor.

The invention contemplates the utilization of an extended sensor system having a configuration determined by the demands of the area in which the water alert system is to be installed. The resistor type sensor is compatible with the electronic resistive circuitry and as such allows complete coverage of an area or specific coverage of an area depending upon the requirements of the area in which the water alert system is to be installed. In addition, the water alert system sensor is expandable in that additional strips of mylar sensing ribbon may be attached to existing mylar ribbon sections to provide additional coverage without the necessity of recalibrating the water alert electronic circuitry. The extended sensor, which in the preferred embodiment, is a thin mylar tape containing a silver ink conducting tracks which allows a micro detection of water since the ribbon assumes a low profile, typically only being a few thousandths of an inch, so that small streams of water coming in contact with the mylar ribbon will cause the resistive sensor circuit to be activated and the alarm sounded or the water latching mechanism to be activated to shut-off the water to the house or residence. The configuration of the sensor and its material provides the advantage of long life and low cost.

The present system is fully integrated with the circuitry of fire alarms and burglar alarms currently on the market and as such may be used in conjunction with an existing fire alarm to provide low-cost water alert detection capabilities. The electronic detection and alert circuitry utilizes low current and may be operated with a low battery voltage to detect and alert occupants of the existence of leaky appliances or the flooding of a predetermined area. In addition, the electronic circuitry may be coupled with either an AC or DC water shut-off valve solenoid units to shut water off at the source of its input into an appliance or at a point where the water is connected to the residence.

The cabinet housing which includes the electronic detection and alert circuitry may be mounted at a place remote from the expanded sensing device. The configuration of the cabinet allows an easy mounting to floor, walls, ceiling, or pipes with the internal base plate being of a configuration to allow the unit to be snapped together with a minimum of tools.

One of the many advantages of the present invention is that additional sensing ribbons may be added to existing sensing lines without the recalibration of the electronic sensing circuitry. In addition as a result of the design of the resistance sensor, small amounts of water heretofore undetectable by existing prior art systems can be readily detected by the sensor device of the present system and water can be shut off and controlled prior to extensive damage that might not be otherwise corrected by existing prior art systems. This is because the sensor of the present invention provides a more accurate and reliable indication of water leaks since there is little chance for water to flow under or around the sensor and the amount of water coming into contact with the sensor is less than the amount of water required to activate prior art sensors. Moreover, as a consequence of the design and construction of the present invention it is far less expensive to manufacture and much easier to install than prior art systems and provides a considerably more reliable water detection system for the protection of business and residences.

DESCRIPTION OF THE DRAWINGS

Other advantages of the invention will become apparent to those skilled in the art in the following detailed description of the invention in conjunction with the appended drawings in which:

FIG. 3 is a bottom plan view of one embodiment of a connecting bridge for connecting portions of the extended sensor;

FIG. 4 is a top plan view of a short piece of the extended sensor;

FIG. 5 is a top plan view of a portion of the extended sensor utilizing connectors for joining sections of the extended sensor;

FIG. 6 is a top plan view depicting one illustrative embodiment of the application of water detection system to a basement area utilizing water appliances;

FIG. 7 is one form of a diagrammatic lay-out of a circuit utilized in conjunction with the extended sensor system of the invention; and FIG. 8 is a schematic representation of a circuit that may be operatively connected to the circuit of FIG. 7 for effecting water shut off when battery power is diminished below a predetermined value.

DETAILED DESCRIPTION OF THE INVENTION

Figure 1:
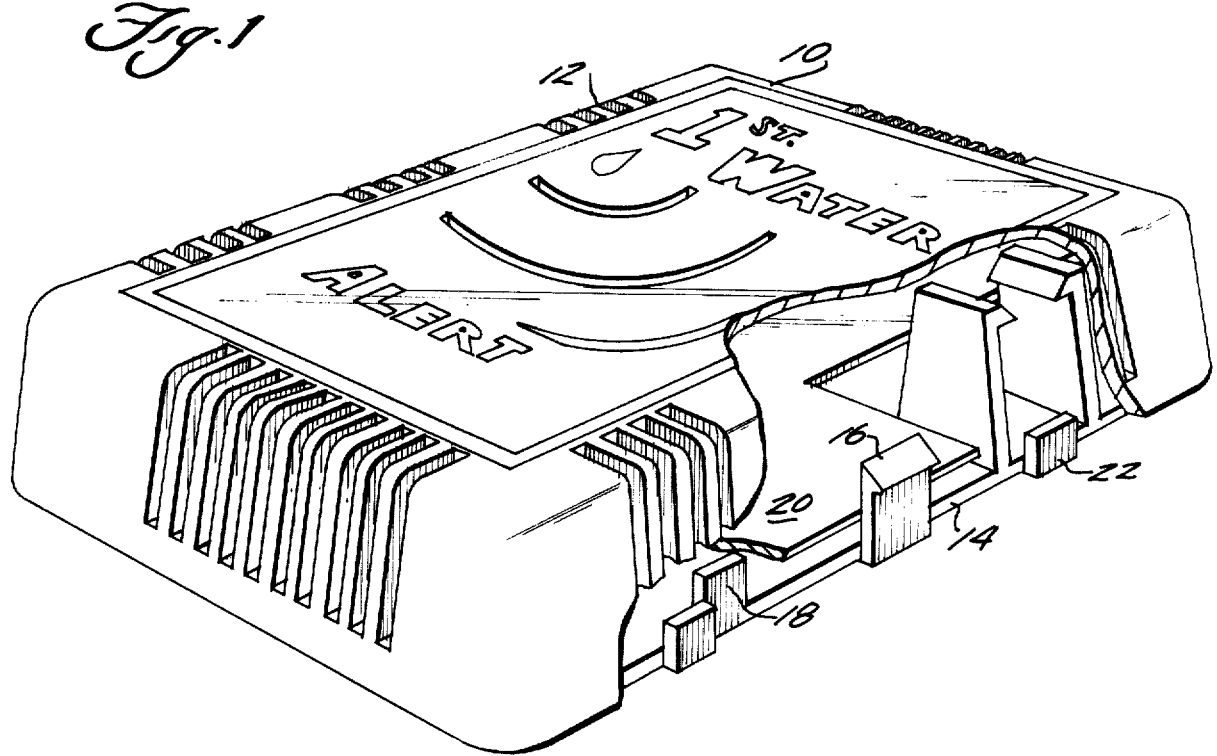
FIG. 1 is a perspective view partly in section of the water alert housing illustrating a portion of the circuit board and electronic circuitry of the water detection device.

Referring now to FIG. 1, cabinet housing 10, may include a plurality of louvres 12, to allow sound generated by a warning known to be heard by occupants of the apartment or home in which the system is installed. The cabinet housing 10, includes a base plate 14 for mounting on the floor, walls, ceiling or pipes or other area of the residence. The base plate 14 preferably includes a plurality of wedge-shaped fasteners 16 to engage a confronting projection (not shown) in the cabinet housing. The base plate 14 also includes a series of positioning and support bars 18 for supporting a circuit board 20 in position in the cabinet housing.

A series of rectangular key devices 22 may be included in the base plate 14 to assist in the placement of the cabinet housing 10 over the base plate 14. The cabinet housing 10 when joined together with the base plate 14 provides a low profile cabinet which when connected with the extended sensor provides an efficient light-weight water alert system. Preferably the cabinet housing 10 is made of two pieces, a top and the base plate 14 for housing an electronic circuit board 20 and which includes an opening in the cabinet for joining the sensor strip to a pair of terminals provided in the circuit board 20. A plastic boss may be provided on the lower half of the cabinet to allow a screw mount if the cabinet is to be mounted to walls, ceilings, pipes and the like.

Figure 2:
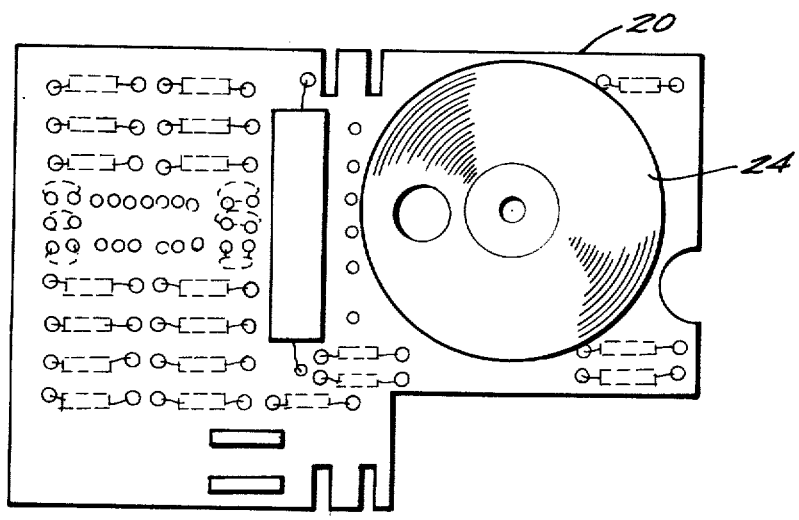
FIG. 2 is the top plan view of a circuit board and warning alert horn of the water leak detection system.

A typical resistive measuring circuit board 20 as may be utilized in conjunction with the water alert system of the present invention is illustrated in FIG. 2. Circuit board 20 includes a horn or alarm sounding device 24 and a series of resistors and electronic components for detecting changes in the resistance of the sensors for the detection of leaks and unwanted water in the vicinity of the extended sensor. In view of the potential shock hazard involved in utilizing water in household electricity, it is preferable to utilize a battery to provide power for the water detection system electronics. Suitable battery power for the water alert system can employ a standard nine-volt alkaline battery. The resistive measuring circuitry of the present invention can be of the type that is utilized in common fire alert integrated circuits such as is available from manufacturers such as National Semiconductor Inc., Motorola, and General Instruments which utilize extremely low power and provide continuous protection for about one year.

The electronic detection and alert system includes basically three modules which include the input sensor detection circuit which measures the resistance of the extended sensor to determine whether leaks have been detected by the sensor, a battery monitor circuit to monitor the power of the battery and provide a warning or indication of low battery power in order to insure that the circuit maintains its level of operation and an alert output circuit for activating horn 24 in the event water is detected by the water alert sensing unit.

Referring now to FIGS. 3, 4 and 5, the extended sensor and various modes for the installation and the utilization of the sensing system is illustrated. The extended sensor which consists of a thin strip of flexible mylar 30 preferably having an adhesive backing and preferably two silver ink strips 32 and 34 which are utilized to detect water by monitoring the resistance of the extended sensor. The extended sensor as illustrated in FIG. 4 could be manufactured and purchased from a manufacturer such as Chromerics Inc. by their construction of an extended sensor by the fabrication of mylar and silver ink elements as is similarly used in their micro motion keyboards. Such strips have heretofore been used for keyboards in computer systems but have been found to operate as superior water detection sensing devices when combined with the resistive circuitry. Alternatively, the extended circuitry may be constructed utilizing thin film mylar which then may be coated with silver ink available from such manufacturers as E. I. Dupont, Denemours & Company and other ink supply companies.

Strips 30 may be installed in straight lengths and thereafter combined in the housing 10 (FIG. 1) to provide a water alert sensing system for detecting small amounts of water or large pools of water. Where an intricate design or pattern for the disposition of the sensor is contemplated, an L-shaped connector 36 is illustrated in FIG. 3 may be utilized for joining lengths of the extended sensor 30. The L-shaped joint includes two slot shaped areas 38 and an L-shaped ridge 40 for securely engaging the sides 42 and 44 of the mylar strip 30. A pair of spaced terminals 46 and 48 are provided in the L-shaped connector for making contact with the silver ink strips 32 and 34 of the extended sensor 30. Similarly, a pair of terminals 52 and 54 are provided to connect another length of the extended sensor 30 to provide either a T-shaped or L-shaped section depending upon whether an additional two or three sensors are connected to openings 70, 72, 74, and 76 of the connector device 36. It will be recognized that connector device 36 may be designed in a Y-shape or any other shape desired for the installation of the extended sensor over a basement or other areas of a residence or industrial complex having computers or other equipment that are sensitive to or may be damaged by water.

The straight strips 30 can be a continuous roll of some twenty to one hundred feet in length and cut with an ordinary pair of scissors for ease of installation and thereafter plugged into L- or T-connector to be configured for the specific water detection application. Preferably on the bottom surface, both the straight strips and the L- or T-strip sections, is a strong general adhesive which can be joined by the pressing together of the L- or T-shaped connector 36 with the mylar elongated sensor 30. Similarly, the edge 40 of the L-shaped connector 36 may similarly be covered with a strong adhesive so that the connector may be pressed into place on the floor, wall, ceiling or other area in which the sensor and connector is installed. It will be recognized that the sensor may be installed either face up or face down depending upon whether the sensor is attached to the basement floor or to the ceiling in situations where the possibility exists for obtaining water damage through seepage from floors or levels above the area to be protected.

The length of the extended sensor may be joined together in any configuration desired by the user, one such configuration is illustrated in FIG. 5 wherein the sensor is installed on the floor with a L-shaped connector for joining pieces of the extended sensor to provide an overall U-shaped extended sensor device. In this configuration, the strips 32 and 34 are facing upward from the floor so that small pools of water or streams of water coming in contact with the thin edge 42 and 44 flow on the mylar strip and on to the conductive silver ink strip thereby modifying the resistance and sounding the water alert detection device.

As will be recognized from FIG. 6, the extended sensor of the present invention allows the custom configuration of the sensor system to allow the water alert system to detect the presence of water over any particular area the user desires. In addition, unlike prior art systems utilizing a capacitive sensing system, the present system does not have to be recalibrated whenever new lengths of sensor are added to an existing sensor network. One such custom configuration of the sensor system of the present invention is illustrated in FIG. 6 wherein a sensor assembly 10 is mounted to the wall with sensor lines 30 surrounding a water tank 60 and a boiler or furnace 62 utilizing hot water. In this configuration, any leaks from either the hot water tank 60 or boiler 62 may be detected by the system prior to extensive destruction caused by water leaks.

The present invention, unlike prior art water detection systems, efficiently provides for the detection of water drips or flows which would ordinarily cause damage because of absorption into the wood floor or other area in which a system is installed. On the other hand, the present system while being sensitive to minute trickles of water does not provide an alarm if only water beads are involved. In cases where water beads are involed such as in condensation or small drops of water do not activate the system while slow yet steady streams of water are detected. As is well known to those skilled in the art of the plumbing industry, water leaks do not migrate in predictable paths on surfaces. The migration of water is dependent on variables such as the severity of the leak, the angle of the floor, discontinuities in the floor, adhesion and cohesion of the water molecule, and the surface substrate, mineral content to the water, constructing material and the absorbency of the underlying substrate. As a result, spot sensors and detectors have not been practical for most commercial and residential operations.

The silver ink tracks coated on the mylar insulation material provides the necessary flexibility of mounting and a corrosive resistance to water. The mylar insulation substrate of the sensor along with an adhesive backing provides for secure and reliable sensor mounting that has a long life. In addition, additional strips of the extended sensor may be added to the present system without the necessity of recalibration of the entire system.

Referring now to FIG. 7, a low power integrated input sensor detection circuit is illustrated which is designed to utilize a standard nine-volt alkaline battery a typical example of which is an MC 14461 circuit manufactured by Motorola. This circuit, as will be recognized by those skilled in the art, is only one form of a resistive sensing circuit system that may be utilized in accordance with the present invention. The electronic detection and alert system consists of three basic modules. These modules include the input sensor detection circuit, a battery monitor circuit, and an alert output circuit.

The input sensor detection circuit utilizes a common fire alarm integrated circuit such as is available from such manufacturers as National Semiconductor Inc., Motorola, and General Instruments. These circuits are ideally suited for low power battery operation and are generally known as CMOS technology devices. These devices assume a resistive change of detectable input and may be combined with the extended sensor to provide a resistive water detection sensor system. A resistive voltage divider network is employed between the input sensor and the integrated circuit inputs. A capacitive filtering may be utilized where high impedence of the input sensor is encountered and where there is a susceptibility to induced transient voltages. The input of the integrated circuit device provides a reliable and accurate sensing detection due to the internal chip reference circuit.

The second module, or the battery monitor circuit, continuously monitors the battery condition by placing a predetermined load on the battery and sensing the resultant voltage drop. If the battery is determined to have degenerated to an output of an unacceptable range, the integrated circuit provides an output which indicates the battery is beginning to fail. The output may then result in an audible tone for an adequate amount of time to alert the occupant of the condition of the battery before failure of the water alert system can occur. This system provides a 24-hour continuous leak protection system year round independent of power line outages. If a water shut-off valve is used, the low battery detection output can then be coupled with a second electric system to provide the automatic shut-off of incoming water until such time as the battery is replaced to provide normal water flow.

The third module utilized in this system is the alert output circuit which consists of a drive circuit to handle the audible horn 24 (FIG. 2) and/or a AC/DC solenoid on a water shut-off valve. These inputs are of parallel operation and utilize one output of the integrated circuit and then buffer this output to drive the horn or solenoid. An output of this circuit will result where there is a detection of a water leak or the detection of a low battery as heretofore described. The output for the detection of water however, will preferably be continuous in comparison to the low battery detection which will generate an intermittent output.

When the present system in accordance with its preferred embodiment operates a water shut-off valve, the detection of the leak or low battery will result in the electronic latching of a triac device (see FIG. 8). This latching will activate the water shut-off valve solenoid thus turning off an incoming water supply to the leaking system. The present invention includes the circuit which will electronically latch and operate a direct current (DC) or an alternating current (AC) solenoid valve. The present invention may in addition to, or in view of the remote water shut-off provide a remote audible or visual indication of the presence of water. The present invention utilizes a resistive type sensing system coupled with the extended sensing system which as will be recognized by those skilled in the art, may be utilized in combination with existing fire alarm or burglary alarm equipment that employ resistive circuit boards.

It will be further recognized that with minor variations the circuitry and format of the extended sensor can be fabricated in various sizes and configurations to suit a variety of particular industrial and residential applications. It will further be recognized that a system can be modified to accomodate a variety of water detection situations such as the utilization of the system on ceilings, floors, walls and other areas in the residence. It will further be recognized that the advantages incumbent in the present invention such as efficiency of use, ease of assembly at the work site, and the simplicity of design allows the present invention to be constructed and utilized and be modified in a number of ways to suit a variety of particular applications which are within the contemplation of the present invention. These and other modifications and applications of the present invention may be made within the spirit and scope of the invention as defined in the appended claims.

What is claimed is:

1. A resistive liquid detection and shut-off system comprising:
    means for detecting liquid drips, flows and trickles, but not liquid beads, on a floor area where liquid damage could result, said means including an elongated sensor comprising a flexible plastic tape with an adhesive backing and having a surface thereof with a pair of conductive metal strips thereon spaced apart in a dimension perpendicular to the dimension of elongation of said tape;
    detection circuit means operatively connected to said elongated sensor for measuring resistance changes in said elongated sensor;
    a solenoid-operated water shut-off valve;
    output circuitry means operatively connected to said detection circuit means and said water shut-off valve for activating said water shut-off valve in response to predetermined resistivity changes in said elongated sensor;
    a battery for providing power for said detection circuit means, solenoid valve operator, and said output circuitry means; and
    battery monitoring circuitry means operatively connected to said battery and said shut-off valve for monitoring the strength of said battery and for operating said shut-off valve if said battery strength drops below a predetermined value.

2. A system as recited in claim 1 wherein the elongated sensor tape is formed in at least two pieces, and further comprising: a connector for interconnecting the two pieces of the sensor tape, the connector comprising
    a body of electrically insulating material having two pairs of electrically connected electrical terminals mounted thereon, the terminals of each pair being spaced apart a distance corresponding to the spacing of the conductive metal strips; means defining a pair of slots in said body, each for receipt of a piece of said tape for allowing said conductive metal strips of said tape to contact said terminals within said body; and adhesive means for maintaining each piece of said tape in contact with said connector body.

3. A resistive liquid detection system comprising:
    means for detecting liquid drips, flows and trickles, but not liquid beads, on a floor area where liquid damage could result, said means including an elongated sensor comprising a flexible plastic tape with an adhesive backing and having a surface thereof with a pair of conductive metal strips spaced apart in a dimension perpendicular to the dimension of elongation of said tape, said tape being formed in at least two pieces;
    a connector for interconnecting said two pieces of said sensor tape, said connector comprising: a body of electrically insulating material having two pairs of electrically connected electrical terminals mounted thereon, the terminals of each pair being spaced apart a distance corresponding to the spacing of said conductive metal strips; means defining a pair of slots in said body, each for receipt of a piece of said tape for allowing said conductive metal strips of said tape to contact said terminals within said body; and adhesive for maintaining each piece of said tape in contact with said connector body;
    detection circuit means operatively connected to said elongated sensor for detecting changes in the resistivity thereof;
    an alert means for alerting an individual to resistivity changes in said sensor means;
    output circuitry means operatively connected to said detection circuit means and said alert means for activating said alert means in response to predetermined resistivity changes in said elongated sensor; and
    power means for providing electrical current for powering said circuitry means and said alert means.

4. A system as recited in claims 3 or 2 wherein said pairs of electrical terminals are disposed with respect to each other at an angle other than 180°.

* * * * *